(12) United States Patent
Braun et al.

(10) Patent No.: US 12,441,024 B2
(45) Date of Patent: Oct. 14, 2025

(54) PLANAR MATERIAL AND METHOD FOR THE PRODUCTION THEREOF

(71) Applicant: SWISS KRONO TEC AG, Lucerne (CH)

(72) Inventors: Roger Braun, Willisau (CH); Joachim Hasch, Berlin (DE); Volker Schwind, Berlin (DE); Norbert Kalwa, Horn—Bad Meinberg (DE)

(73) Assignee: SWISS KRONO TEC AG, Lucerne (CH)

( * ) Notice: Subject to any disclaimer, the term of this patent is extended or adjusted under 35 U.S.C. 154(b) by 641 days.

(21) Appl. No.: 17/604,532

(22) PCT Filed: Jan. 9, 2020

(86) PCT No.: PCT/EP2020/050451
§ 371 (c)(1),
(2) Date: Oct. 18, 2021

(87) PCT Pub. No.: WO2020/211988
PCT Pub. Date: Oct. 22, 2020

(65) Prior Publication Data
US 2022/0203574 A1    Jun. 30, 2022

(30) Foreign Application Priority Data

Apr. 18, 2019  (EP) ..................................... 19170159
Jul. 2, 2019   (EP) ..................................... 19183998

(51) Int. Cl.
*B27N 3/00*   (2006.01)
*B27N 1/00*   (2006.01)
(Continued)

(52) U.S. Cl.
CPC ............. *B27N 3/002* (2013.01); *B27N 1/006* (2013.01); *B27N 3/04* (2013.01); *C08L 61/28* (2013.01);
(Continued)

(58) Field of Classification Search
CPC .......... B27N 3/002; B27N 1/006; B27N 3/04; C08L 61/28; C08L 2205/03;
(Continued)

(56) References Cited

U.S. PATENT DOCUMENTS 5,492,756 A   2/1996  Seale et al.
5,985,429 A   11/1999 Plummer et al.
(Continued)

FOREIGN PATENT DOCUMENTS

CN   109249491 A   1/2019
DE   102007041438 A1   3/2009
(Continued)

OTHER PUBLICATIONS

Ash, Michael; Ash, Irene, "Part II. Chemical Component Cross-Reference from MAA to 2MZ" from Handbook of Plastic and Rubber Additives, vols. 1-2 (2nd Edition), Synapse Information Resources, Inc., ISBN 978-1-68015-104-6, pp. 1374-1375 (Year: 2015).*

(Continued)

*Primary Examiner* — Brian Handville
(74) *Attorney, Agent, or Firm* — Bachman & LaPointe, P.C.

(57) ABSTRACT

The invention relates to a planar material, comprising lignocellulose fibers and binding agents. In order to provide a planar material that using fibers has reduced swelling, it is provided that the proportion of the binding agent has more than 50 wt % of the planar material. The invention also comprises a method for producing the planar material.

20 Claims, 1 Drawing Sheet

(51) Int. Cl.
*B27N 3/04* (2006.01)
*C08L 61/28* (2006.01)

(52) U.S. Cl.
CPC ....... *C08L 2205/03* (2013.01); *C08L 2205/06* (2013.01); *C08L 2205/16* (2013.01)

(58) Field of Classification Search
CPC .. C08L 2205/06; C08L 2205/16; C08L 97/02; C08G 2170/20; C09J 161/28; C09J 175/04
See application file for complete search history.

(56) References Cited

U.S. PATENT DOCUMENTS

| | | |
|---|---|---|
| 2004/0235983 A1 | 11/2004 | Stadler et al. |
| 2007/0042664 A1 | 2/2007 | Thompson et al. |
| 2015/0017461 A1 | 1/2015 | Lindgren et al. |
| 2015/0197942 A1 | 7/2015 | Pervan et al. |
| 2015/0342224 A1* | 12/2015 | Medoff ................ A61K 8/9722 426/63 |
| 2018/0272558 A1 | 9/2018 | Kalwa et al. |

FOREIGN PATENT DOCUMENTS

| | | | |
|---|---|---|---|
| EP | 3189950 A1 | 7/2017 | |
| EP | 3208086 A1 | 8/2017 | |
| EP | 3725481 A1 | 10/2020 | |
| WO | 2006002015 A1 | 1/2006 | |
| WO | WO-2009027385 A1 * | 3/2009 | ............... B27N 3/28 |
| WO | 2009050565 A1 | 4/2009 | |
| WO | 2009065769 A2 | 5/2009 | |
| WO | 2011107900 A1 | 9/2011 | |
| WO | 2016071007 A1 | 5/2016 | |

OTHER PUBLICATIONS

International preliminary report on patentability for patent application No. PCT/EP2020/050451 dated Jul. 8, 2021.
International search report for patent application No. PCT/EP2020/050451dated Apr. 20, 2020.
Office Action dated Mar. 1, 2023 for corresponding application CN202080029160.2.
Fundamentals of Building Materials Science, Gao Feng, Zhu Hongbo et al., Shanghai: Tongji University Press, Aug. 2016.
Modern Adhesive Technology Manual, Li Zidong et al., Beijing: New Times Press, Jan. 2002.

* cited by examiner

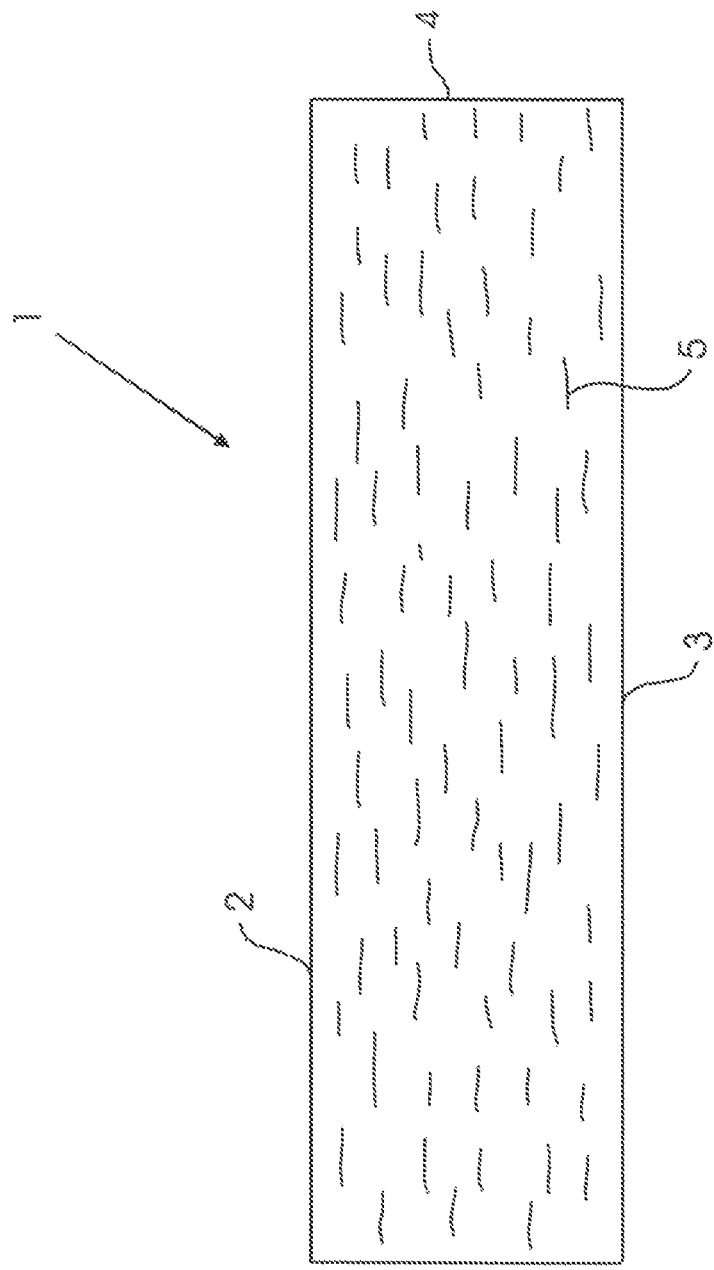

PLANAR MATERIAL AND METHOD FOR THE PRODUCTION THEREOF

BACKGROUND OF THE INVENTION

The invention relates to a planar material and a method for the production thereof as well as the use of the planar material.

Planar materials made of lignocellulose fibers are used in many applications because their production is cost-effective and technologically established. The use, for example, of high-density fiberboards (HDF) is typical, wherein wood fibers are pressed together using binding agents to form boards, which are then usually coated with papers that have been impregnated with synthetic resin. This coating cures under the effect of pressure and temperature so that a firmly bonded laminate is formed. This laminate is cut up and the pieces are profiled on the edges in order, for example, to be used as a non-glued floor covering. The material, however, is exposed on the profiled edges. In the presence of water, the wood fibers on the exposed edges begin to swell due to water absorption, which leads to a change in shape of the wood material board. In this case, the water can be either free-flowing water or even high humidity. High humidity, which can, for example, depend on the seasons or be caused by technical conditions, may prohibit the use of laminate, even if swelling is largely reversible so that the swelling can be mostly reversed through drying. Swelling, however, cannot be made fully reversible, so after an initial swelling, an unsightly open gap remains.

Alternatives to laminate are wood-plastic composites (WPCs), an extruded mixture of wood fibers and plastic, which are described, for example, in DE10 2007 041 438 A1, U.S. Pat. No. 5,985,429 A, CN 109249491 A1, and US 2004/0235983 A1. With a sufficiently high proportion of plastic, a WPC is dimensionally stable under the influence of water or respectively moisture. However, the production requires the use of extruders that are not suitable for the production of planar materials with larger dimensions.

Finally, materials are available from which non-swelling planar materials can be produced and which contain no wood fibers or other wood components. They therefore do without a renewable raw material that is available in large quantities and has good strength properties. These include, for example, stone-plastic composites (SPCs) or polyvinyl chloride (PVC) as raw materials. Halogens or also terephthalates are typically used here, such that these products are disadvantageous from an environmental perspective. The planar material according to the invention is low-emission or emission-free; in particular the emission of formaldehyde can be largely reduced or avoided so that the regulations of the state of California regarding formaldehyde emissions CARB 2 can be complied with. Volatile organic compounds (VOCs) can also be largely or completely avoided.

Furthermore, WO 2011/107900 A1 teaches a planar material being reduced in swelling, which comprises up to 50 wt % of binding agent and additionally fibers and expanded particles. The method of production is complex and the material comprises a variety of components.

SUMMARY OF THE INVENTION

It is an object of the invention to provide a planar material and a method for its production using fibers having reduced swelling.

This object is achieved by a method and a planar wood material as disclosed herein. The use of the planar material according to the invention is also disclosed herein.

The invention relates to a planar material comprising fibers and binding agents, characterized in that the proportion of the binding agent is more than 50 wt % in relation to the planar material. Fibers in the context of this invention are solid particles that are elongated, i.e., their diameter is multiple times smaller than the longest dimension of the particle. The dimensions of the fibers can be chosen within a wide range; they are determined in particular by the board thickness and according to the specifications for the homogeneity of the planar material. The diameter of the fibers is from 10 µm to 5 mm, and the length of the fibers from 0.05 mm to 100 mm.

The planar material therefore has a greater proportion of binding agent than fibers. The binding agent proportion can also be expressed in relation to fibers, meaning the proportion of binding agent is given with reference to the weight of the fibers used. In the case of hygroscopic fibers, which can absorb moisture (e.g., lignocellulose fibers), the proportion of fibers is given as fibers dried to a constant weight, usually fibers dried to a constant weight at 105° C. (atro fibers: absolutely dry fibers). The binding agent proportion in the planar material is then, in relation to the proportion of fibers, more than 100 wt %.

For the planar material according to the invention, organic or inorganic fibers can be used. Natural fibers, for example lignocellulose fibers, cotton or linen fibers, or synthetic fibers such as fibers made of thermoplastic material such as polyethylene or polypropylene, but also made of polycarbonate, polyacrylate, polymethacrylate, or polyurethane can be used for the production of the material according to the invention. Inorganic fibers such as carbon fibers or fibers made of mineral or ceramic raw material or glass fibers are suitable in particular in a mixture with other fibers for the production of the planar material. In particular, mixtures of fibers, in particular mixtures of the aforementioned fibers, can be used for the production of the material according to the invention. Mixtures of fibers enable properties of the material according to the invention to be adjusted, for example, the elasticity or the bending properties, the dimensional stability, the strength, but also the production properties or respectively the processability. If fibers made of renewable raw materials, in particular lignocellulose fibers, for example fibers made of wood, bamboo, or annual plants, are used, cost-effective, easily processable fibers are thus available. Natural fibers are preferably used untreated, i.e., the properties of the fiber components cellulose and lignin, and if applicable hemicellulose, are not altered by chemical methods. The use of hygroscopic fibers is not precluded, in particular insofar as these are at least partially dried before the production or respectively pressing of the material according to the invention.

The lignocellulose fibers mentioned above comprise in particular all fibers that have been obtained from plants through chemical or physical methods. Typical examples of physically obtained fibers are coniferous wood fibers, deciduous wood fibers, or bamboo fibers, or fibers from other organic raw materials that have been obtained through mechanical defibration. An example of chemically obtained fibers is, for example, pulp fibers from wood, annual plants, or other raw materials, in particular renewable raw materials. Particularly typically, wood fibers from mechanical defibration are used, wherein it is sought to minimize the loss of lignin and hemicellulose as much as possible. Mixtures of fibers can also be used, in particular to adjust properties of the material (strength properties, weight), but also to use the raw material fiber in a cost-optimized manner. In the context of this invention, fibers are also fiber bundles; this also includes smaller shavings, as long as their fibers can still be largely coated with binding agent.

The material according to the invention is planar, i.e., it typically has two main faces, which will also be referred to in the following as the upper face and the lower face. The narrow faces or edges of the material are arranged between the upper face and the lower face. The thickness of the finished planar material can be from 0.8 mm to 500 mm, typically between 1 mm and 80 mm, usually between 3 mm and 30 mm. A typical application may require a thickness of the planar material of 4 mm to 10 mm, in particular between 4 mm and 7 mm. The material according to the invention can have flat main faces, but the upper face and/or lower face can also be imprinted or milled or machined in another way, so that, in relation to the face of the material, a variable thickness of the material results. The material preferably has a composition that is substantially homogeneous across the thickness. The edges, the height of which corresponds to the thickness of the material, can be machined with common tools. They can be sawed, cut or milled. The planar material according to the invention is limited in its maximum length and width only by available presses that are used for the production of the material.

Smaller dimensions can be produced by breaking apart the planar material. Typical dimensions of the planar material can be 5600 mm (length)×2070 mm (width) after production in the press, 1380 mm×195 mm, after separation into floor, wall or ceiling panels, or 3048 mm×2800 mm. The last format is particularly well suited for use in construction because the width of the board has a floor height.

The planar material according to the invention can be used in many applications. It can be used, for example, as a floor, ceiling and/or wall covering, for the production of interior fittings or furniture, in particular also for interior finishing of vehicles such as vehicle cabins, but also outdoors, both as cladding, for example as a mounted facade, and for structural uses. The planar material according to the invention can be coated, dyed, painted, or decoratively designed in another manner. In particular surface coatings, as they are known, for example, in the area of wood materials, can be applied to the surface of the material according to the invention. Furthermore, the planar material according to the invention can be used as a component of a sandwich board, meaning that the material according to the invention can be connected to the same or different film or planar materials, in particular wood material boards, but also plastic boards or films, to form a sandwich board.

The material according to the invention differs from the WPC described above in that it is not plastic, in particular thermoplastic, that is formed with fibers into a planar material, but rather a binding agent is used that enters into a cohesive and/or adhesive interaction with the fibers. Such binding agents are known, for example, from wood material production according to the prior art. The binding agent used according to the invention preferably has melamine. Melamine is used in an aqueous solution as melamine resin, wherein the solids content of the melamine is preferably at least 45 wt % in relation to the aqueous solution; advantageously, the solids content is over 50 wt. %. The upper limit of the solids content is given by the solubility and, if applicable, processability of the melamine in, for example, spray nozzles. Melamine is preferred as a binding agent because it is non-swelling and non-hygroscopic and is resistant to hydrolysis. Melamine can either be used alone as the binding agent or in combination with one or more other binding agents. In connection with this invention, "in combination" means that mixtures of binding agents can be used, wherein either the mixture of two or more binding agents is applied simultaneously to the fibers, for example as MF resin (melamine-formaldehyde resin). Or a combination of binding agents is used that are used one after the other, for example because they cannot be used in a mixture or because separate application of different binding agents has an advantageous effect. In combination with the melamine mentioned above or as an alternative, additional binding agents such as formaldehyde, methylene diphenylisocyanate (MDI), also in emulsified form as eMDI, or polymeric diphenylmethane diisocyanate (PDMI), but also polyurethane can be used. Phenol resin is water-resistant but also dark in color, which is disadvantageous in use. As described above, two or more binding agents can also be used in combination. It is preferred that the binding agent have mostly melamine. It is further preferred that the proportion of melamine in the binding agent exceeds 20 wt. %, in particular 50 wt. %. Preferably, the binding agent is urea-free, since urea promotes hygroscopicity and therefore swelling of the lignocellulose fibers, or respectively does not prevent it. Thermoplastic binding agents are advantageously avoided. The planar material according to the invention is preferably free of halogens (e.g., fluorine, chlorine), but also of terephthalates.

According to an advantageous embodiment, the elastic properties of the planar material can be modified, in particular improved, by adding an elastomer or thermoplastic that is used as a plasticizing additive, for example by adding polyvinyl acetate (PVAc) or ethylene vinyl acetate. Acrylate, styrene acrylate or polyurethane (PU) are preferably used to plasticize the planar material according to the invention, in particular in the form of a liquid additive such as a dispersion, because they are water-resistant. Preferably, acrylate, styrene acrylate and PU with a glass transition temperature of TG of less than 0° C. are used. But mono- or diethylene glycol are also suitable for plastification of the planar material. The plasticizing additives mentioned above can each be used alone but also in a mixture. The addition of elastomers or thermoplastics reduces the brittleness of the planar material and improves the elastic properties of the planar material according to the invention, for example the E modulus. Moreover, the addition of plasticizing additives causes the planar material to more easily lie flat. The plasticizing additive is used as a solid calculated proportionally in relation to the amount of solids in the synthetic resin used. The plasticizing additive is used, in relation to the synthetic resin, in a ratio of 1:1, preferably 0.7:1, in particular 0.2:1, advantageously 0.01:1. The plasticizing additive is therefore preferably not used as the main component of the binding agent, especially not as the quantitative main component. The plasticizing additives are added, for example, to the binding agent, for example melamine resin, before the application to the fibers and are applied to the fibers together with the binding agent. Alternatively, the agent for plasticizing can be applied to the fibers before or after the binding agent.

The binding agent, with the plasticizing additive added if applicable, forms the largest proportion of the planar material according to the invention, usually the predominant proportion of the material according to the invention. Preferably, the planar material has, in relation to the fiber proportion, more than 100 wt %, for example 101 wt % or 102 wt % to 120 wt % binding agent; advantageously, the material has more than 150 wt % binding agent, particularly preferably more than 200 wt % binding agent, a maximum of 500 wt % binding agent, in each case in relation to the proportion of fiber.

The density of the material according to the invention is preferably between 1000 kg/m³ and 1800 kg/m³, in particular between 1000 kg/m³ and 1600 kg/m³, advantageously between 1000 kg/m³ and 1300 kg/m³, particularly advantageously between 1030 kg/m³ and 1200 kg/m³. The material according to the invention shows, as a result of the high use of binding agent, a higher weight, for example between 1000 kg/m³ and 1200 kg/m³, in comparison to, for example, a wood material, for example an HDF board, that has quantitatively primarily lignocellulose fibers.

The material preferably has fillers. Fillers can contribute as aggregates to optimizing the weight of the planar material, usually to minimize it, or to further improve the matrix structure formed by binding agent and fibers. An aggregate or a combination of aggregates can alternatively or additionally serve to optimize certain properties of the boards, for example, conductivity, insulting properties, or strength properties. An aggregate replaces fibers in the material according to the invention. Since the material should have minimal swelling in the presence of water, in particular a minimized swelling of thickness, non-hygroscopic or non-swelling aggregates and aggregates that are resistant to hydrolysis are preferred. Such aggregates can be mineral particles, but also ceramic, synthetic, or glass particles. Calcium carbonate ($CaCO_3$) and/or barite ($BaSO_4$) can also be used as aggregates. The size of the particles is preferably not greater than a millimeter, preferably between 10 μm and 800 μm. Mixtures of different particles can also be used, for example mixtures of different materials or size. Up to 30 wt % in relation to the total weight of the planar material is used, particularly preferably up to 20 wt %, advantageously up to 15 wt %. The lower limit of the amount used results from the detectability of an aggregate. The aggregate can be applied to the fibers before or after applying the binding agent, preferably by spraying.

According to an advantageous embodiment of the invention, the planar material has hydrophobing agents, for example paraffin or wax, which are typically used in amounts of up to 5 wt % in relation to the weight of the planar material, usually in amounts of up to 2 wt %, often in an amount of 0.1 wt % to 1 wt %. The use of hydrophobing agents also contributes to a reduction in the swelling tendency of the planar material.

The invention also relates to a method for producing a planar material comprising fibers and binding agents, wherein the proportion of binding agent in the planar material is more than 50 wt %, having the steps of:
providing fibers,
providing the binding agent, preferably in liquid form,
applying the binding agent to the fibers,
forming a fiber cake,
pressing the fiber cake in a press while curing the binding agent to create a planar material.

The steps of the method correspond to those of a conventional method, for example, for producing a wood material board in a press. According to the invention, however, a greater amount of binding agent is used as previously known, so that the proportion by weight of the binding agent is greater than the proportion by weight of the fibers.

If synthetic or inorganic fibers are used, it may be necessary to dry the binding agent on the fibers at least partially. If the fibers have moisture, which is typical, for example, for lignocellulose fibers, the moisture content should be adjusted before pressing the fiber cake so that a dimensionally stable, non-swelling or non-shrinking board exists after pressing. The lignocellulose fibers are often used with moisture of up to 120 wt % or more before gluing. The lignocellulose fibers can be dried before or after binding agent is applied. During pressing, it is preferred that the lignocellulose fibers have moisture content of a minimum of 3 wt % to a maximum of 15 wt %, meaning a water content of at least 3 wt % to 15 wt % in relation to the total weight of the fibers.

The binding agent is typically provided in liquid form. It can be provided in pure form or—as is typical—in solution, either in solvent or in water or as a dispersion or emulsion. The binding agent is usually applied to the lignocellulose fibers by spraying, for example by a plurality of spray nozzles that create a spray mist of the binding agent and are arranged around a downstream flow of fibers. A typical design for such a dry device is, for example, a blowline, which is used in fiber board production. The surface of the fibers is wetted with binding agent droplets, or respectively by a binding agent mist. After they have been optimally dried, the fibers wetted with binding agent are formed and pressed into a fiber cake. During this process, the binding agent cures, so that a planar material is formed. During curing, which takes place under the effect of pressure and temperature substantially on the upper face and lower face of the fiber cake, irreversible chemical bonds are established between the fibers and binding agent, but also within the binding agent, in contrast to WPC products. The method according to the invention avoids the effort of kneading and extruding.

Surprisingly, it has been found that the pressing conditions are substantially the same as in particular those of known wood materials with a lower proportion of binding agent compared to the invention. Pressure and temperature as well as pressing duration are, for example, within the range of typical HDF boards (high-density fiberboard). The material according to the invention can be produced excellently in presses as they are used for producing wood materials. In particular, continuous or discontinuous hot presses, for example continuous double-belt presses with circulating, heated metal belts or presses working in cycles. This allows board formats to be produced that—in contrast to WPCs—are not limited to the production of narrow plank formats with a width of approx. 30 cm. Rather, conventional board formats can be provided that are typical for wood material boards.

As is typical for wood materials, the fiber cake is typically produced by scattering. The fibers, which are either freshly glued with the entire amount of the binding agent or preferably dried, are scattered onto a carrier, usually on a conveyor belt, usually in a homogeneous layer but alternatively also in multiple layers, wherein the layers can have different compositions with regard to fibers, binding agent or additives. The scattered fiber cake is guided on the carrier, if applicable first through a preliminary press, and then pressed in a press. The press acts on the upper face and lower face of the fiber cake or respectively the planar material.

Any press that applies sufficient pressure and temperature is suitable, both a plate press in which the material is pressed between two plates and in particular a continuous press in which the material is pressed between two circulating metal belts. Preferably, hot presses are used, the press plates or circulating metal belts of which are heated to a specified temperature. Suitable pressing temperatures can be chosen from 140° C. to 220° C., preferably from 160° C. to 180° C. The thinner the board, the lower the chosen press temperature can be. Suitable pressing pressures are, for example, within a range from 0.3 N/mm² to 5.5 N/mm², in particular 1 N/mm² to 3 N/mm². The pressing duration is advantageously 6 seconds/mm of board thickness (in the following: s/mm) to 60 s/mm, usually 10 s/mm to 20 s/mm. In continuous presses, the feed speed of the circulating metal belts, between which the planar material is produced by pressing, is usually between 350 mm/second and 400 mm/second.

A preliminary press for compressing the fiber cake can be placed upstream of the actual pressing process. Optionally, a device for cooling the planar material can be placed downstream of the press, in particular a device for cooling under a specified pressing pressure, which can be lower than the pressing pressure during the pressing of the material.

The aggregates, wet strengthening agents or hydrophobing agents described above can be added to the material according to the invention, typically before or during the formation of the fiber cake.

The material produced according to the method according to the invention preferably has a surface that has substantially binding agent, optionally the plasticizing additive, particularly preferably a surface that consists of binding agent or respectively the plasticizing additive. In particular when using hygroscopic fibers, for example lignocellulose fibers, it is sought to have as few fibers in the surface of the material as possible in order to optimize the swelling in thickness as much as possible. Water in liquid form or also, for example, as humidity would be soaked up by the hygroscopic fibers and this would result in swelling of the material. This is unwanted. The high or respectively predominant proportion of binding agent in the planar material enables a surface of the material that comprises predominantly or completely binding agent and, if applicable, a plasticizing additive, or respectively comprises few or no hygroscopic fibers.

The material according to the invention can be machined like a wood material board, for example, like an HDF board. The surface can be coated, imprinted, or milled; the edges can be profiled, for example for producing floor panels. The planar material according to the invention can be laminated with synthetic resin-impregnated papers, and it can be printed, painted, glazed, or machined in another manner. It is to be considered as an advantage of this invention that the planar material can be machined and processed on existing devices.

Furthermore, the invention includes a device for producing the planar material described above, comprising means for gluing lignocellulose fibers with binding agent that has, according to the invention, means for gluing already preglued lignocellulose fibers. The term "gluing" here means applying binding agent. The means for gluing fibers are advantageously designed as nozzles that create a spray mist from binding agent supplied as liquid. Fibers are guided through the spray mist of binding agent and binding agent droplets of the spray mist are then deposited on the fibers. Known means for gluing lignocellulose fibers are configured such that they apply a maximum of 30 wt % binding agent in relation to the fibers to be glued. The method according to the invention can be performed in that the fibers to be glued pass the known means for gluing multiple times until binding agent has been sufficiently applied to the fibers. According to the invention, however, it is proposed to arranged a plurality of the known means for gluing so that the fibers to be glued are conveyed along a plurality of means for gluing, wherein each means for gluing applies a partial amount of the binding agent to the lignocellulose fibers until the desired total amount of at least more than 50 wt % of the planar material has been applied to the fibers. Therefore, in addition to the known means for gluing unglued fibers (fibers without binding agent), additional means for gluing preglued fibers are used, onto which a partial amount of binding agent has already been applied.

The planar material according to the invention can be adapted to various requirements through different combinations of fibers, binding agent, fillers, and, if applicable, other additives such as waxes. Therefore, reference is explicitly made to the fact that the features described above can each be freely combined with each other.

The invention also relates to the use of the planar material described above. It characterizes the planar material according to the invention in that it can be used in a variety of applications due to the minimal swelling, in particular the nearly completely reduced swelling in thickness in the region of the edges. In interior finishing, the planar material can be used, for example, as a floor board or floor laminate. Here, in contrast to, for example, HDF floor panels, the use in damp and wet rooms is also possible because the edge profile on which the board core is freely accessible to moisture no longer significantly swells under the influence of water or high humidity nor shrinks while drying. A swelling in thickness that is, in relation to the original board thickness, less than 3%, preferably less than 2%, is considered non-significant in the context of the invention. Planar materials according to the invention that are optimized for minimal swelling in thickness have a swelling in thickness in accordance with DIN 317 or respectively an edge swelling in accordance with DIN 13329 of only 0.5% to 1%. The planar material according to the invention is therefore low-swelling or, when a maximum swelling in thickness of up to 1% in relation to the original board thickness is reached, swelling-free and dimensionally stable. Therefore, a planar, substantially non-swelling material that is dimensionally stable against water or respectively humidity can now be produced, for example, on known devices for producing wood material boards, which material is not limited to narrow formats and preferably maximizes the use of renewable raw materials.

Of course, the planar material according to the invention can also be used as a wall or ceiling board, as a furniture board, in particular when finishing damp and wet rooms or laboratory and technical rooms or workshops, but is not restricted thereto. In exterior construction, the material according to the invention is suitable as a facade board or for roofing. The planar material according to the invention can be used, for example, for terrace construction, including decking or outdoor flooring. In this way, it becomes possible to use the same flooring or respectively floor covering for indoor and adjacent outdoor areas (terraces, balconies, facades, access paths). Preferably, the planar material according to the invention can be used for outdoor structures, in particular furniture. The finishing of workshops, production facilities, or stables can take place, for example, with the material according to the invention without difficulty. The planar material can optionally be designed as a panel and be provided with a profile on the edges as needed. The profile preferably serves to fix two panels to each other. Alternatively, two panels arranged next to each other can also be fixed at their edges by double-sided adhesive tape that is arranged in the region lateral to a gap between the directly adjacent panels. Adhering directly adjacent panels or boards is also possible, wherein a water-resistant adhesive is preferably used.

The planar material according to the invention has good strength properties, in particular a high transverse tensile strength that is at least 2.5 N/mm², preferably up to 3

N/mm², in particular up to 4 N/mm². The material according to the invention has a high compressive strength. As a result of the good strength properties, fewer fastening means, e.g., screws, must be used to fasten a board made of the material according to the invention, because the individual fastening means have better hold in the board. The higher transverse tensile strength also allows a more intensive machining of a board made of the material according to the invention, for example milling complex profiles into the lateral edge of a board. For example, a complex profile that aligns two interlocking boards both in the vertical and in the horizontal direction can be worked into the lateral edge of a board that is only 4.3 mm thick. The high compressive strength enables a high point load on the planar material, such that it is suitable, for example, for loading floors of vehicles or as a floor for storage areas. The high bending stiffness of the planar material allows for use as a construction element, for example wall reinforcements.

BRIEF DESCRIPTION OF THE DRAWINGS

Details of the invention are explained below with regard to exemplary embodiments. It is shown in:

FIG. 1 a schematic representation of a planar material according to the invention.

DETAILED DESCRIPTION

The FIGURE shows a planar material 1 with an upper face 2 and a lower face 3 as well as an edge 4. The material has fibers 5 that are embedded in binding agent. The proportion of binding agent is more than 50 wt % of the planar material. There is therefore more binding agent than fiber 5. Natural, synthetic, organic, and inorganic fibers can be used as the fibers, both individually and in a mixture. Hygroscopic fibers such as wood, cellulose, or linen fibers can also be used. Melamine is preferably used as the binding agent, often in combination with formaldehyde or phenol but also in a mixture with PMDI. Examples of combinations of fibers and binding agent are described below.

Exemplary Embodiment 1

For the experiment whose results are shown in Table 1 below, lignocellulose fibers, in this case coniferous wood fibers, were used. The fibers were produced from steamed wood chips through defibration in a refiner. Alternatively, any other lignocellulose fibers or mixes of such fibers can be used. The coniferous wood fibers are used with a moisture of 120% before gluing; before pressing, they are dried with the binding agent located thereon to a residual moisture of 8%, i.e., a ton of fibers contains 80 kg of water.

For this experiment, more than 100 wt %, in the present case 108 wt %, of binding agent in relation to atro wood is used, here a binding agent comprising melamine-formaldehyde resin (MF resin). The melamine-formaldehyde resin (MF resin) used in the binding agent had a solids concentration of 60% (measured at 60 min/120° C.). Thus, 180 grams of liquid binding agent, containing 108 g of MF resin, were applied to 100 grams of atro fiber material (atro wood), taking into account the liquid content (108 g at 60% solids concentration=180 g). "Atro wood" here refers to lignocellulose fibers that have been dried at 105° C. to a constant weight. "Atro wood" is a typical reference measure for formulations containing lignocellulose fibers. The other exemplary embodiments are based on the absolute use of the binding agent.

Furthermore, 1.2 wt % paraffin in relation to atro wood is used.

The binding agent is applied to the lignocellulose fibers in four passes; 27 wt % is applied to the fibers per pass. The liquid binding agent is sprayed through nozzles in a known device for gluing fibers. The spray mist created by the nozzles condenses on the surface of the fibers that pass the spray mist, e.g., fall downwards from above through the spray mist of binding agent.

Drying the glued fibers in means for drying comes after the device for gluing fibers, for example a hot air tunnel or duct that applies heated air to the fibers. The goal of drying is not to completely remove all the liquid, but to dry the binding agent to an extent that it no longer sticks. The reactivity of the binding agent during curing under the effect of pressure and/or temperature should not be negatively impacted by the drying.

After drying, the fibers can be stored, or glued or processed further. First comes a second pass through the device for gluing, in which again 27 wt % MF resin is sprayed onto the fibers, which are already preglued after the first pass. The glued fibers are also dried after the second pass until they no longer adhere or stick to each other. In the same way, a third and fourth pass through the device for gluing and the means for drying are performed. Alternatively, the 110 wt % binding agent can also be applied to the fibers in one or two passes, or alternatively also in five or more passes. The amount of binding agent applied to the fibers per pass can vary from pass to pass.

After each pass, a part of the glued fibers is removed and processed to form a planar material with a thickness of 7 mm. This occurs by scattering a fiber cake, which is pressed in a known continuously operating double-belt press at 180° C. and a pressure of 2.5 N/mm² with a pressing during of 15 s/mm. The board created in this way has a thickness of 5.5 mm and a density of 1050 kg/m³. As a reference, on one hand, a planar material produced under the same conditions without an increased addition of binding agent is examined (Table 1, pass 0).

The planar material produced in this way is examined for swelling in accordance with DIN 317 and for edge swelling in accordance with DIN 13329. The swelling in thickness is determined at an edge of the material as an absolute change in mm in relation to the starting thickness of 7 mm and also as a relative change (%).

TABLE 1

Swelling in thickness for a planar material, thickness 7 mm, binding agent use increasing from 0 to 108 wt %

| Pass no. | 0 | 1 | 2 | 3 | 4 |
|---|---|---|---|---|---|
| Difference, absolute (mm) | 1.47 | 0.50 | 0.25 | 0.21 | 0.12 |
| Difference, relative (%) | 22.92 | 7.45 | 3.82 | 3.05 | 1.83 |

In the planar material without the addition of a binding agent (pass 0), the swelling in thickness according to Table 1 is, as expected, at a maximum at nearly 23%. Each pass, in which 27 wt % MF resin is applied each time, reduces the swelling in thickness at the edge of the planar material. An exceedingly low value of 1.83% edge swelling is achieved when 108 wt % binding agent in relation to atro wood is used.

Exemplary Embodiment 2

For the fiber proportion of the planar material in exemplary embodiment 2, a 50:50 mixture of different fibers, in this case, for example, wood fibers and carbon fibers, alternatively, for example, recycled paper fibers and fiberglass fibers, alternatively mineral fibers and cellulose fibers, is used. The natural fibers (wood, recycled paper, cellulose fibers) here are preferably dried before gluing; the fibers can be mixed before or after the gluing and the optional drying of the binding agent. Both variants allow a homogeneous mix of glued fibers to be produced, which can then be scattered to form a fiber cake. Otherwise, exemplary embodiment 2 is identical to exemplary embodiment 1 with regard to the use of the binding agent and the use of paraffin.

Exemplary Embodiment 3

Exemplary embodiment 3 relates to a mixture of fibers and binding agent in which 50 parts of polyethylene fibers and 20 parts of carbon fibers and 10 parts of aggregate, for example glass, mineral or ceramic particles, form the fiber proportion, which is glued with 115 wt % binding agent, in this case, for example, with MF resin. The fiber/aggregate/binding agent mix is otherwise treated as in exemplary embodiment 1.

Exemplary Embodiment 4

A board made of fibers and binding agent should be produced that can be used for producing a floor covering and can in particular be coated with a decorative surface, in particular either with synthetic resin-impregnated papers or by painting. 40 wt % fibers with a density of approx. 550 kg/m$^3$ and 55 wt % of a binding agent, in this case an MF resin with a melamine proportion of more than 60%, are used. In addition, 5 wt % other materials are used, in this case 1.5 wt % paraffin and 3.5 wt % gray dye. The dye is used to give the planar material a uniform color.

The planar material with the composition mentioned above is produced on an industrial continuous press and compared to HDF boards that have been produced from the same fiber material but with a binding agent proportion of 15 wt % and have a density of 880 kg/m$^3$.

TABLE 2

Comparative experiments on swelling of an HDF board and a board according to the invention

| Experiment | Board thickness (mm) | Binding agent (%) | Density (kg/m$^3$) | Transverse tensile strength (N/mm$^2$) | Swelling of raw board (%) | Edge swelling, coated (%) |
| --- | --- | --- | --- | --- | --- | --- |
| Standard HDF | 6 | 15% | 880 | >1.4 | 18-22 | 14-18 |
| Planar material | 5.8 | 137.5% | 1050 | >4.5 | 0.1-.03 | 1.0-1.2 |

Table 2 above shows the two boards in comparison, with the board thickness given in mm as a gross value (before sanding) and the density in kg/m$^3$. The boards were each evaluated according to transverse tensile strength (DIN EN 319), swelling (measured in accordance with EN 317), and edge swelling (measured in accordance with EN 13329).

The board according to the invention can be more strongly compressed than a fiber board due to the high fiber proportion. The use of binding agent is approx. 9 times higher than with the HDF board according to the prior art. The planar material according to the invention has a transverse tensile strength that is three times higher and a swelling of the raw board that is reduced by a factor of 100.

After laminating the upper face and the lower face, the "coated" edge swelling is measured. Only the edges are still accessible to the effect of water since the upper face and lower face of the board are sealed by the lamination and are no longer accessible to the water. This test is especially meaningful for floor coverings because the edges of the floor panels typically cannot be sealed and thus are subject to water. In this case, an edge swelling for the board material according to the invention that is reduced to a tenth in comparison to a known HDF board is shown. Both the HDF board and the planar material according to the invention were produced on the same industrial production system.

The invention claimed is:

1. A method for producing a planar material, comprising lignocellulose fibers (5) and a binder comprising a binding agent and a plasticizing additive, wherein the proportion of the binding agent with the plasticizing additive is more than 50 wt % of the planar material (1), wherein the plasticizing additive is not used as the main component of the binder, comprising the steps of:
   providing lignocellulose fibers (5);
   providing the binding agent, wherein the binding agent has melamine resin, formaldehyde resin, phenol resin, methylene diphenylisocyanate (MDI), also in emulsified form as eMDI, polymeric diphenylmethane diisocyanate (PDMI), polyurethane, or mixtures of the aforementioned binding agents as well as the plasticizing additive;
   applying the binding agent with the plasticizing additive to the fibers (5), wherein the plasticizing additive is applied with the binding agent to the fibers,
   forming a fiber cake from the fibers provided with the binding agent and with the plasticizing additive;
   pressing the fiber cake in a press while curing the binding agent to create a planar material (1) having a single layer from an upper face (2) to a lower face (3) of the planar material, wherein the plasticizing additive and the binding agent are used in a ratio of 0.2:1 to 0.01:1.

2. The method according to claim 1, wherein acrylate, styrene acrylate, polyurethane, polyvinyl acetate, ethylene vinyl acetate, mono- or diethylene glycol are added as the plasticizing additive of the planar material.

3. The method according to claim 2, wherein the plasticizing additive is used as a solid.

4. The method according to claim 2, wherein the plasticizing additive is applied to the fibers before or after the binding agent or is mixed with the binding agent before being applied to the fibers and is then applied to the fibers.

5. The method according to claim 1, wherein a continuous or a discontinuous hot press is used for producing the planar material.

6. The method according to claim 1, wherein the pressing temperature is 140° C. to 220° C.

7. The method according to claim 1, wherein the pressing pressure is 0.3 N/mm² to 5.5 N/mm².

8. The method according to claim 1, wherein the pressing duration is 6 seconds/mm of board thickness to 60 seconds/mm of board thickness.

9. The method according to claim 1, wherein, when applying the binding agent and the plasticizing additive, the fibers are subsequently dried.

10. The method according to claim 1, wherein the binding agent is provided in liquid form.

11. The method according to claim 1, wherein the pressing step comprising pressing the fiber cake to create the planar material having a thickness of between 3 mm and 80 mm.

12. The method according to claim 1, wherein the planar material (1) comprises natural fibers, synthetic fibers, inorganic or organic fibers, or mixtures of fibers.

13. The method according to claim 12, wherein the organic, natural fibers comprise lignocellulose fibers from renewable raw materials.

14. The method according to claim 12, wherein the synthetic fibers comprise fibers made of thermoplastic material.

15. The method according to claim 12, wherein the inorganic fibers comprise fibers made of mineral, ceramic, or glass materials.

16. The method according to claim 1, wherein the fibers comprise atro wood, and wherein a proportion of binding agent in relation to atro wood is more than 101 wt %.

17. The method according to claim 1, wherein the planar material (1) has an aggregate, non hygroscopic or non-swelling fillers.

18. The method according to claim 17, wherein mineral, ceramic, synthetic, or glass particles are used as the aggregate.

19. The method according to claim 1, wherein the planar material (1) has hydrophobing agents.

20. The method according to claim 1, wherein the planar material has a homogeneous composition from the upper face to the lower face.

* * * * *